United States Patent
Klusemann

(12)
(10) Patent No.: US 6,701,224 B1
(45) Date of Patent: Mar. 2, 2004

(54) METHOD FOR DETERMINING THAT A MOTOR VEHICLE IS CLIMBING OR DESCENDING A SLOPE

(75) Inventor: Rainer Klusemann, Frankfurt am Main (DE)

(73) Assignee: Continental Teves AG & Co., oHG, Frankfurt (DE)

(*) Notice: Subject to any disclaimer, the term of this patent is extended or adjusted under 35 U.S.C. 154(b) by 0 days.

(21) Appl. No.: 10/049,931
(22) PCT Filed: Aug. 17, 2000
(86) PCT No.: PCT/EP00/08022
§ 371 (c)(1), (2), (4) Date: Feb. 20, 2002
(87) PCT Pub. No.: WO01/14187
PCT Pub. Date: Mar. 1, 2001

(30) Foreign Application Priority Data

Aug. 20, 1999 (DE) .......................... 199 39 438
Aug. 20, 1999 (DE) .......................... 199 39 439
May 26, 2000 (DE) .......................... 100 26 102

(51) Int. Cl.$^7$ ............................... G06F 7/00
(52) U.S. Cl. .................. 701/1; 701/36; 701/51
(58) Field of Search .................. 701/1, 36, 70, 701/51, 79, 93, 94, 96; 702/138, 140; 180/170, 1, 179

(56) References Cited

U.S. PATENT DOCUMENTS 5,423,601 A   6/1995  Sigl
5,794,170 A   8/1998  Kuroda et al.
6,317,678 B1 * 11/2001 Linden .......................... 701/94
6,363,310 B1 *  3/2002 Schuplin ....................... 701/93
6,473,712 B1 * 10/2002 Faye et al. .................... 702/138

FOREIGN PATENT DOCUMENTS

| DE | 40 02 035 | 8/1990 |
| DE | 42 09150 | 9/1992 |
| DE | 197 32 554 | 2/1999 |
| DE | 199 39 979 | 8/2000 |
| EP | 0 774 390 | 5/1997 |

* cited by examiner

Primary Examiner—Richard M. Camby
(74) Attorney, Agent, or Firm—Rader, Fishman & Grauer PLLC

(57) ABSTRACT

The invention relates to a method for determining that a motor vehicle is driving uphill or downhill, and for this purpose the vehicle acceleration $a_{ref}$ is determined by means of differentiation from $V_{ref}$ and compared with a longitudinal vehicle acceleration $a_L$ determined by a sensor. The method checks whether there is a deviation from normal driving by monitoring whether $|a_L - a_{ref}|$ is greater than a threshold value SL. In addition a deviation time t is determined, within which the deviation from normal driving prevails without interruption; the deviation time t is monitored to determine whether a minimum time value $T_M$ is exceeded in order to conclude that the vehicle is climbing or descending a slope when t is greater than $T_M$. The invention also relates to a device that uses a digital logic with a counter to measure the times $t, t_1, t_2$ and $t_K$, with one digit of the logic corresponding to a defined time unit.

12 Claims, 1 Drawing Sheet

METHOD FOR DETERMINING THAT A MOTOR VEHICLE IS CLIMBING OR DESCENDING A SLOPE

TECHNICAL FIELD

The present invention generally relates to a method for determining the descending/ascending status of a moving vehicle.

BACKGROUND OF THE INVENTION

Modern motor vehicles are equipped with different electronic systems for controlling and regulating the driving performance. Examples are brake force control systems (ABS), driving stability programs (ESP) and traction slip control systems (TCS, BTCS or TSC). Depending on their design, the control programs integrated in the electronics of these systems evaluate a varying number of sensors provided in the motor vehicle. These are, for example, wheel speed, longitudinal acceleration, transversal acceleration and engine torque sensors. The electronics in a traction slip control system ensure that the wheels accelerating the vehicle do not spin when the vehicle is accelerated strongly. This can be achieved by braking the spinning wheel and/or by throttling the propulsion power (engine torque reduction).

DE-A 3809101 discloses a method and a circuit arrangement for controlling a TCS by means of brake and engine intervention. According to this method, the wheel brake is used for controlling the traction slip and/or the system intervenes in the control of the driving engine. For this purpose, the traction slip control, amongst others, uses the components usually found in anti-lock systems (ABS), which are provided in any case. The communication with the required vehicle components (for example the engine) can occur through a vehicle databus (CAN). For the purpose of executing the method, sensors for determining the rotational wheel behavior are evaluated by electric circuits in order to process signals, and actuating signals for generating electromagnetic hydraulic valves are generated, thus making control of the braking force possible. The electronics of the system need the so-called vehicle reference speed $V_{ref}$ for calculating the required actuating value. As a rule, this value is determined on the basis of the wheel speeds of the individual wheels. In special driving situations, one or several wheels may no longer provide the current vehicle speed since one of the wheels is spinning. In this case, the spinning wheel is not used for calculating the vehicle reference speed $V_{ref}$.

The control algorithms of the ABS use the vehicle reference speed $V_{ref}$ as an essential input variable. When the vehicle reference speed deviates from the actual vehicle speed $V_t$, this may cause an unjustified activation of the anti-lock system, which leads to a decrease in braking pressure for a certain time. Due to the dangers connected to this, a deviation between $V_{ref}$ and the actual speed $V_t$ should, if at all, prevail for as short a time period as possible.

In the electronic systems for controlling the driving performance described above, the effects of driving uphill or downhill, which are especially important in all-wheel vehicles, are not taken into consideration at all or not sufficiently. If, for example, a traction slip control determines that the driving wheels are spinning, the vehicle reference speed while driving uphill would be too high because of an erroneous interpretation of the longitudinal sensor. As a result the traction slip control would not respond adequately to the traction slip, e.g. by reducing the engine torque. On the other hand, the ABS control would be too sensitive when driving downhill.

BRIEF SUMMARY OF THE INVENTION

Hence, it is the object of the present invention to provide the electronic systems customarily used today for controlling the driving performance with an improved method for determining that the motor vehicle is driving uphill or downhill, so that the vehicle reference speed $V_{ref}$ can be approximated more quickly to $V_t$, meaning that the electronic systems for controlling the driving stability, etc. which use the vehicle reference speed as an input variable, can be applied more reliably.

According to the present invention, this object is solved by a method for determining that a motor vehicle (1) moving at the speed $V_t$ is climbing or descending a slope, including the following steps:

determining a vehicle reference speed $V_{ref}$ by means of wheel speed sensors (2), wherein $V_{ref}$ can, if necessary, be corrected through extrapolation of acceleration data, engine torque data and/or information on the gear level that is engaged, especially when wheels (3) are spinning exclusively;

determining a vehicle acceleration $a_{ref}$ from $V_{ref}$ by means of differentiation (4);

comparing $a_{ref}$ with a vehicle longitudinal acceleration $a_L$ (5) determined by sensors, a) checking whether there is deviation from normal driving by monitoring whether the value of the difference $a_L - a_{ref}$ is greater than a threshold value SL, with SL being greater than zero (6), b) determining a deviation time t within which the determined deviation from normal driving prevails uninterruptedly (7), c) monitoring whether the deviation time t exceeds a minimum time value $T_M$, with $T_M$ being greater than zero, and d) concluding that the vehicle is driving uphill or downhill when t is greater than $T_M$.

According to the present invention, the fact that the motor vehicle is descending or climbing a slope can be determined by means of vehicle data given in the motor vehicle in any case, e.g. longitudinal acceleration, engine torque or wheel speed. For this purpose, a vehicle reference speed $V_{ref}$ is determined first on the basis of the wheel sensor signals in a manner known from the prior art. For example, the wheel speed of the slowest rotating wheel can be used for this purpose. By means of differentiation, which, for example, can be numerical, a vehicle acceleration $A_{ref}$ can be calculated or generated based on this vehicle reference speed. According to the present invention, this vehicle acceleration is then related to a vehicle acceleration of other sensors. If it seems necessary, a plausibility evaluation of the vehicle acceleration determined on the basis of the wheel speeds may be carried out. When it is plausible that the current vehicle reference speed does not correspond to the actual vehicle speed, this can be extrapolated on the basis of the determined vehicle acceleration (for example, directly from the derived vehicle reference speed or from the acceleration detected by the sensors). For this purpose, for example, a vehicle acceleration is estimated as accurately as possible corresponding to the methods described in P 98938709.7 (P9071) and the unpublished patent application P 19939979.4 (P9584). However, this extrapolation can only be executed without corrections if driving uphill or downhill is not determined at the same time.

P 98938709.7 (P9071) already proposes that driving uphill or downhill be taken into consideration when correcting or extrapolating the vehicle reference speed. This is done according to the method known from the prior art in that spinning of the wheels is detected only if the angular speeds and/or angular acceleration of the wheels differ from one another by certain minimum amounts, or to put it differently, if the above-mentioned values do not lie within a certain value range. In this connection, the knowledge based on past experience is used, i.e. that the wheels do not spin symmetrically, but rather in an uncoordinated fashion; and this means that marked differences in values occur.

According to the present invention, however, wheels spinning equally occur in today's all-wheel vehicles, especially such vehicles that are equipped with an essentially rigid all-wheel clutch (e.g. Haldex clutch), meaning that the method known from the prior art no longer works.

In a motor vehicle with all-wheel drive it may happen that the vehicle reference speed determined over a long period of time on the basis of the wheel speed signals does not correspond to the actual vehicle speed, since all wheels that can be used for this purpose spin on a slippery surface. In the case of spinning wheels, the vehicle acceleration essentially depends on the friction coefficient $\mu$ of the individual wheels. The friction coefficient $\mu$, for example, can be calculated on the basis of the following equation $$\mu = \frac{M_{mot} - J * \omega}{F_N * r_R}$$

Here $\omega$ is the angular acceleration, J is the moment of inertia of an individual wheel, $M_{mot}$ is the engine torque, $F_N$ is the vertical force of the vehicle and $r_R$ is the wheel radius.

The relationship between the engine torque, moment of inertia of the wheels and force transmission can be determined in a particularly easy manner by means of a value table for a certain type of vehicle. As described in P 19939979.4 (P9584), this table contains acceleration values associated to an engine torque value respectively and, if necessary, a column with which the engaged gear step of the vehicle can be taken into consideration, so that conclusions can be drawn regarding the possible acceleration of the vehicle and the vehicle reference speed can be extrapolated.

As mentioned above, the extrapolation of the vehicle speed cannot be sufficiently accurate when the vehicle is driving uphill or downhill. Thus, according to the present invention, in order to obtain a reliable (secured) reference speed, especially when extrapolation has been performed over a long period of time, an axle or a wheel of the vehicle preferably is disconnected from the drive and the operating characteristics of the disconnected axle or wheel are examined. If the wheel speed of the disconnected wheel or wheels drops so far that it is less than the vehicle reference speed $V_{ref}$, the determined vehicle reference speed is too high. In this case, the vehicle reference speed has to be corrected to a lower value. This, for example, can occur continuously or preferably in discrete steps by adding a correction value K.

According to the present invention, vehicle acceleration $A_{ref}$ that is derived from the vehicle reference speed $V_{ref}$ is compared with the value of a longitudinal acceleration sensor $a_L$. Based on this comparison, it can be determined whether the vehicle exhibits a deviation from normal driving or not. A deviation from normal driving is given when the amount of $a_L - a_{ref}$ is greater than a fixed threshold value SL, with SL>0. A deviation from normal driving, for example, arises when the vehicle drives uphill or downhill for a long period of time. However, short acceleration of the wheels can lead to a deviation from normal driving, which, however, is only important when driving uphill or downhill for a long time. Thus, according to the present invention, a deviation time t is measured, within which the deviation from normal driving must have occurred. In order to determine whether a vehicle is climbing or descending a slope, the value of the deviation time t is checked and driving uphill or downhill is determined if the time t exceeds a minimum value.

Preferably one deviation time $t_1$ for driving uphill and one deviation time $t_2$ for driving downhill is determined respectively. In this connection, $t_1$ indicates the duration in which the logical equation $a_{ref}-SL>a_L$ is satisfied. The time $t_2$ indicates how long the logical equation $a_{ref}+SL<a_L$ is satisfied. In this way, it is particularly easy to distinguish between driving uphill and downhill.

If, according to the present invention, driving uphill or downhill is determined, this preferably may lead to a correction of the propulsion power, particularly to a change in the engine torque or to the transmission of a corresponding control signal by the electronic system to the driving unit.

The method according to the present invention can be implemented in all-wheel vehicles and vehicles with only one driven axle. In a vehicle without any non-driven axles (all-wheel vehicle), preferably in the event of spinning wheels and taking into account the possibility that the vehicle is climbing or descending a slope, the vehicle reference speed $V_{ref}$ is extrapolated on the basis of the degree of the uphill or downhill driving, with $V_{ref}$ being extrapolated in the direction of $V_r$.

To check (secure) the vehicle reference speed $V_{ref}$, a driven axle preferably is disconnected from the drive and the actual vehicle speed is deduced from the behavior of this non-driven axle. If the non-driven axle slows down to under $V_{ref}$ after being disconnected, it can generally be assumed that the vehicle reference speed is too high. If, however, the speed of the wheels on the disconnected axle does not change, the vehicle reference speed will in general be too low, which allows the conclusion that the vehicle is descending a slope.

If the vehicle reference speed $V_{ref}$ is corrected, this should preferably be done by iteratively adding a correction value K to $V_{ref}$. Depending on the direction from which $V_{ref}$ is approximated to the actual vehicle speed, the correction value K can be either positive or negative. As mentioned above, the value K, depending on whether the vehicle is climbing or descending a slope, is corrected in a suitable manner. Preferably K has a value of about 0.1 g to about 0.3 g.

The threshold value SL, which corresponds to an acceleration, preferably should be between about 0.02 g and 0.2 g, in particular between about 0.04 g and 0.12 g, with the acceleration of the fall being $g=9.81$ ms$^{-2}$. A value of, for example, 0.08 g corresponds to an uphill slope of 8%. Consequently, the counter comprised in the device will always be incremented by the value 1 when a deviation from normal driving with the probability of driving uphill detected by the electronics prevails, with, for example, the increase by 1 corresponding to a time of 7 ms. If a deviation from normal driving with downhill driving detected by the electronics prevails, the counter for the downhill driving detection is incremented by the value 1. If the above-mentioned conditions for driving uphill or downhill are no longer satisfied at an instant of measurement, the counter preferably is decremented by the value of 1 or particularly preferably set to the value 0. In this respect, a negative value is excluded for the counter.

If the deviation from normal driving, which indicates a kind of probability for driving uphill or downhill, is confirmed by a high counter value, this information can be transmitted to the environment as a state change, for example by means of a digital output. For this purpose, it can be checked whether the counter(s) exceeds a certain threshold value, e.g. 200 (given a unit of 7 ms per counting unit, this corresponds to a time of 1.400 ms). If this threshold value is exceeded, the above-described measures are initiated.

According to a preferred embodiment of the present invention, at least one of the wheels or one axle is disconnected from the drive train in order to secure the vehicle reference speed in an all-wheel vehicle. This could prove meaningful in the following situations:

1. The vehicle reference speed determined or extrapolated in relation to all wheel signals is greater than the actual vehicle speed $V_t$.
2. The vehicle reference speed is less than the actual vehicle speed $V_t$.

In order to detect this situation, it frequently is necessary to query one or several of the following conditions:

Activation of the traction slip control (this criterion indicates whether traction slip was detected).

The vehicle reference speed already was modified or extrapolated over an extended period of time (this criterion indicates whether the vehicle reference speed is becoming increasingly implausible).

The actual vehicle acceleration is less than a certain threshold value.

The wheel slip is greater than another threshold value (the wheel slip, for example, can be detected by comparing the individual wheel speed values with the vehicle reference value).

The traction slip control of the engine has been causing torque to be added without interruption for a certain period of time, whereas, at the same time, a low road friction value was detected, or it is constantly in the state of torque reduction.

Preferably, several or all of the above-mentioned criteria are queried in an unlinked fashion. Increasing the vehicle reference speed as a means of adaptation is only possible through extrapolation within certain limits. In order to detect a situation where it is necessary to disconnect several wheels from the drive in an all-wheel vehicle, several or all of the following conditions can be checked; however, they need to be satisfied for a minimum period of time (e.g. 300 ms or more):

The signal of the longitudinal acceleration sensor is greater by a certain minimum value than the vehicle reference acceleration determined from the wheel signals. In this case, the vehicle is climbing or descending a slope.

The engine torque has to be greater than the value ZERO.

The wheel accelerations and/or the wheel speeds of all wheels have to show stable wheel performance (wheel acceleration smaller than the threshold value).

The wheel speeds of the wheels must be higher than the vehicle reference speed.

Preferably, the wheels are disconnected for a duration of less than 2000 ms., in particular for about 300 to 1000 ms. The duration of the disconnection of a wheel/the wheels of the drive train preferably can be 300 to 1000 ms. Preferably, the method ensures that such disconnection does not occur too frequently during a certain period of time. In this way, indifferent vehicle behavior can be avoided while driving on low friction values.

Preferably, the degree of the deviation between $V_{ref}$ and $V_t$ is determined by obtaining an approximation time $t_K$, which is needed to approximate the value $V_{ref}$ in the direction of the actual value for the vehicle speed $V_t$ by means of repeated correction by the correction value K. Particularly preferably, the method according to the present invention can be expanded in that it is determined whether the vehicle was climbing or descending a slope with the help of the determined time $t_K$. In particular, uphill or downhill driving is prevailing when the time $t_K$ exceeds a certain threshold value. This threshold value preferably lies within a range of about 40 to 100 ms.

According to the present invention, the term "approximate" means to approximate one value to another value, however, the value that is to be reached need not be hit exactly.

The assumed vehicle acceleration, which is used for influencing the vehicle reference speed, preferably is changed according to time $t_K$ in such a way that the higher the specified time $t_K$ is, the more the value of the correction value K is increased.

The present invention also relates to a device for executing the above-described method.

Preferably one counter is provided for uphill driving ($t_1$) and downhill driving ($t_2$) respectively.

The above-mentioned method can preferably be realized in a suitably programmed computer-aided control.

The present invention offers the advantage that the method according to the invention, in particular in vehicles equipped with a control system for controlling the longitudinal dynamics and/or transverse dynamics of the vehicle (e.g. BTCS or TCS, or also ESP), makes it possible to determined whether the vehicle is driving uphill or downhill. When the vehicle is driving on a slope, the load distribution on the axles changes in such a way that the engine control is affected detrimentally when there is traction slip control. By means of the method according to the invention, the information on the detection of driving uphill or downhill can be used for improving the engine torque reduction. The frequency of acceleration slumps, as they can occur in connection with traction slip control and driving on a slope, is decreased considerably.

DETAILED DESCRIPTION OF THE PREFERRED EMBODIMENTS

Figure 1:
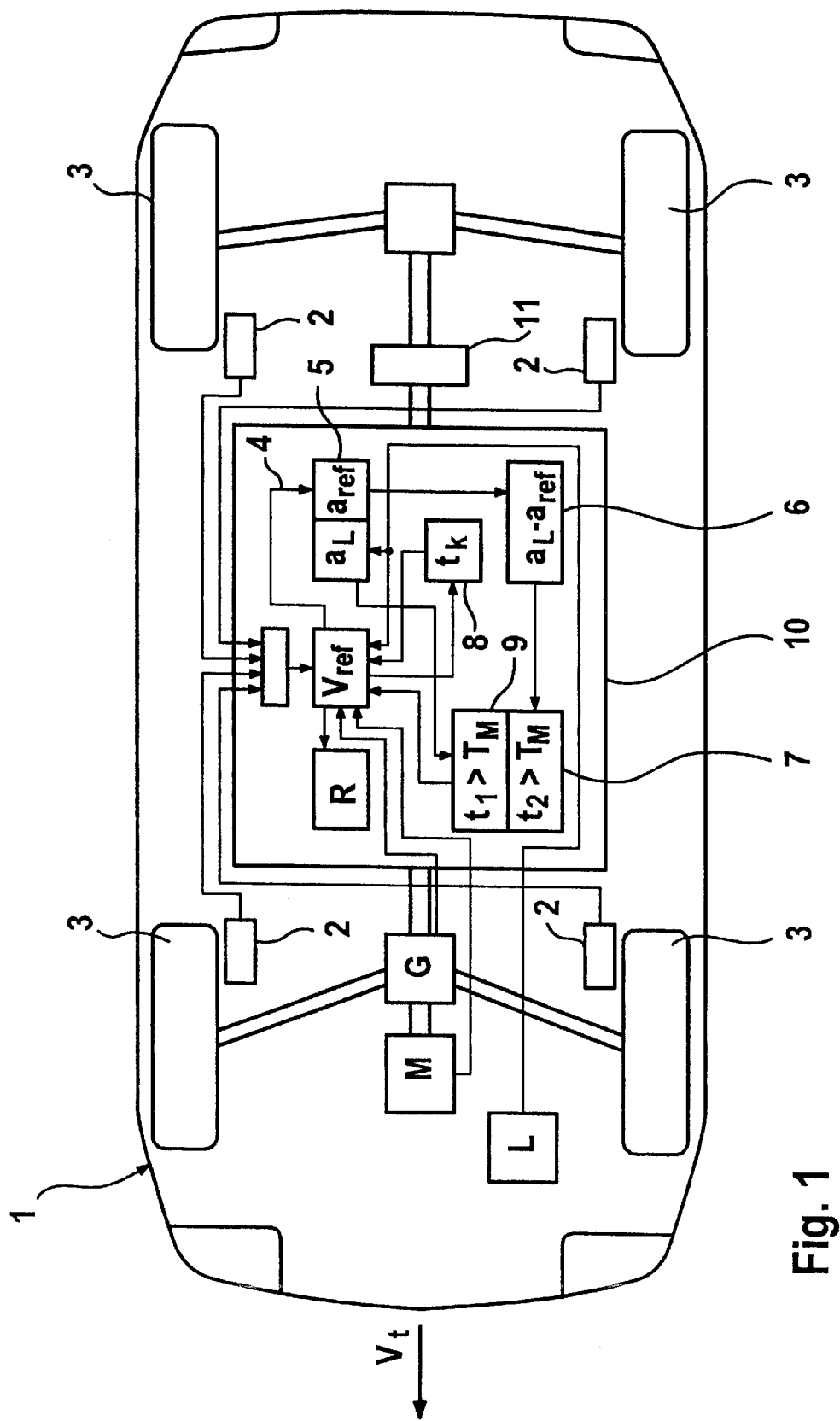
FIG. 1 is a schematic representation of an embodiment according to the invention.

FIG. 1 shows a motor vehicle 1 moving forwards at the vehicle speed (actual speed) $V_t$. The wheel speeds of the wheels 3 are measured by sensors 2 and supplied to an electronic processing unit 10. In the processing unit 10, a vehicle reference speed $V_{ref}$ is generated in a manner known. The vehicle reference speed is supplied to other systems, e.g. the system R (ABS, TCS, ESP). The vehicle reference speed can be corrected or extrapolated on the basis of engine torque data of an engine M and transmission data of a transmission G. Based on the vehicle reference speed, the vehicle acceleration $a_{ref}$ is formed by the processing unit 5 in step 4. In unit 6 $a_L$ and $a_{ref}$ are compared. The deviation times t, $t_1$, $t_2$ are stored in counters in unit 7. If a time threshold value $T_M$ is exceeded, this will cause the information "driving uphill or downhill" to be supplied to the unit for determining the vehicle reference speed $V_{ref}$. Preferably unit 10 contains another unit 9 for separately detecting whether the vehicle is climbing or descending a slope.

Processing unit 10 can access an all-wheel clutch 11 via a cable. If necessary, one axle of the driven wheels can be disconnected from engine M in this way. Moreover, a processing unit 8 is provided, which measures the time $t_k$, which is needed to approximate the value of $V_{ref}$ to the actual vehicle speed.

What is claimed is:

1. A method for determining the ascending or descending status of a moving vehicle, including the steps of:
   a) determining a vehicle reference speed $V_{ref}$ by means of wheel speed sensors,
   b) determining a vehicle acceleration $a_{ref}$ from $V_{ref}$ by means of differentiation;
   c) comparing $a_{ref}$ with a vehicle longitudinal acceleration $a_L$, wherein $a_L$ is determined by sensors,
   d) checking whether there is deviation from normal driving by monitoring whether the value of the difference $a_L - a_{ref}$ is greater than a threshold value SL, with SL being greater than zero,
   e) determining at least one deviation time t within which the determined deviation from normal driving prevails uninterruptedly,
   f) monitoring whether the deviation time t exceeds a minimum time value $T_M$, with $T_M$ being greater than zero, and
   g) concluding that the vehicle is driving uphill or downhill when t is greater than $T_M$,
   wherein said at least one deviation time t includes a deviation time $t_1$ for driving uphill and one deviation time $t_2$ for driving downhill is determined respectively, and that $t_1$ indicates the time period during which the equation $a_{ref} - SL > a_L$ is satisfied and $t_2$ indicates the time period during which $a_{ref} + SL < A_L$ is satisfied.

2. A method according to claim 1, wherein when the wheels in an all-wheel vehicle spin and taking into account that the vehicle may be driving uphill or downhill, the vehicle reference speed $V_{ref}$ is extrapolated on the basis of the degree of the uphill or downhill slope, and for this purpose $V_{ref}$ is extrapolated in the direction of actual vehicle speed.

3. A method according to claim 2, wherein a driven axle or a driven wheel is disconnected from a drive to check $V_{ref}$, and that conclusions regarding the actual vehicle speed are drawn from the behavior of the non-driven axle or wheels.

4. A method according to claim 1, wherein $V_{ref}$ is corrected by iteratively adding a positive or negative correction value K to $V_{ref}$.

5. A method according to claim 2, wherein the extrapolation of the vehicle reference speed $V_{ref}$ takes into account whether the vehicle is climbing or descending a slope.

6. A method according to claim 3, wherein the disconnection lasts for a period of less than 2000 ms.

7. A method according to claim 4, wherein the degree of deviation between $V_{ref}$ and actual vehicle speed is determined by obtaining an approximation time $t_K$, which is needed to approximate the value of $V_{ref}$ in the direction of the actual vehicle speed by correcting it repeatedly by the correction value K.

8. A method according to claim 7, wherein the assumed vehicle acceleration used for influencing the vehicle reference speed is changed according to time $t_K$ in such a way that the value of the correction value K is increased in proportion to the value of the determined time $t_K$.

9. A device for implementing the method according to claim 8, wherein the measurement of the times, $t_K$ is executed by a digital logic with at least one counter, with one digit of the logic corresponding to a defined time unit.

10. A device according to claim 9, wherein said at least one counter includes a counter for driving uphill and a counter for driving downhill.

11. A method for determining the ascending or descending status of a moving vehicle, including the steps of:
   a) determining a vehicle reference speed $V_{ref}$ by means of wheel speed sensors,
   b) determining a vehicle acceleration $a_{ref}$ from $V_{ref}$ by means of differentiation;
   c) comparing $a_{ref}$ with a vehicle longitudinal acceleration $a_L$, wherein $a_L$ is determined by sensors,
   d) checking whether there is deviation from normal driving by monitoring whether the value of the difference $a_L - a_{ref}$ is greater than a threshold value SL, with SL being greater than zero,
   e) determining at least one deviation time t within which the determined deviation from normal driving prevails uninterruptedly,
   f) monitoring whether the deviation time t exceeds a minimum time value $T_M$, with $T_M$ being greater than zero, and
   g) concluding that the vehicle is driving uphill or downhill when t is greater than $T_M$,
   wherein when the wheels in an all-wheel vehicle spin and taking into account that the vehicle may be driving uphill or downhill, the vehicle reference speed $V_{ref}$ is extrapolated on the basis of the degree of the uphill or downhill slope, and for this purpose $V_{ref}$ is extrapolated in the direction of actual vehicle speed.

12. A method for determining the ascending or descending status of a moving vehicle, including the steps of:
   a) determining a vehicle reference speed $V_{ref}$ by means of wheel speed sensors,
   b) determining a vehicle acceleration $a_{ref}$ from $V_{ref}$ by means of differentiation;
   c) comparing $a_{ref}$ with a vehicle longitudinal acceleration $a_L$, wherein $a_L$ is determined by sensors,
   d) checking whether there is deviation from normal driving by monitoring whether the value of the difference $a_L - a_{ref}$ is greater than a threshold value SL, with SL being greater than zero,
   e) determining at least one deviation time t within which the determined deviation from normal driving prevails uninterruptedly,
   f) monitoring whether the deviation time t exceeds a minimum time value $T_M$, with $T_M$ being greater than zero, and
   g) concluding that the vehicle is driving uphill or downhill when t is greater than $T_M$,
   wherein $V_{ref}$ is corrected by iteratively adding a positive or negative correction value K to $V_{ref}$.

* * * * *